A. B. DISS.
CASTER.
APPLICATION FILED AUG. 26, 1913.

1,089,628.

Patented Mar. 10, 1914.

Witnesses:
A. Pschierer
John Stew.

Inventor
Albert B. Diss
By his Attorneys
Binney & Mastick.

COLUMBIA PLANOGRAPH CO., WASHINGTON, D. C.

UNITED STATES PATENT OFFICE.

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER.

1,089,628.  Specification of Letters Patent. Patented Mar. 10, 1914.

Application filed August 26, 1913. Serial No. 786,718.

*To all whom it may concern:*

Be it known that I, ALBERT B. DISS, a resident of Newark, in the State of New Jersey, manufacturer, have invented certain new and useful Improvements in Casters, of which the following is a specification, accompanied by drawings.

The invention relates particularly to casters for wooden furniture legs, but the use is not restricted to wooden legs.

The object of the invention is to provide a caster having an extremely simple, strong, and reliable, but inexpensive, construction of the caster jaws, which is particularly suitable for casters having non-rotary pins driven into the leg and caster jaws swiveling thereon.

The novel features will be readily understood from the following description and claims.

Figure 1:
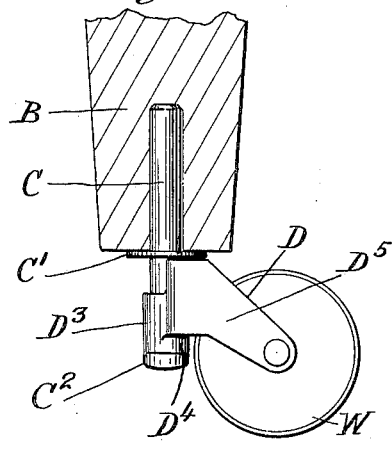
Figure 2:
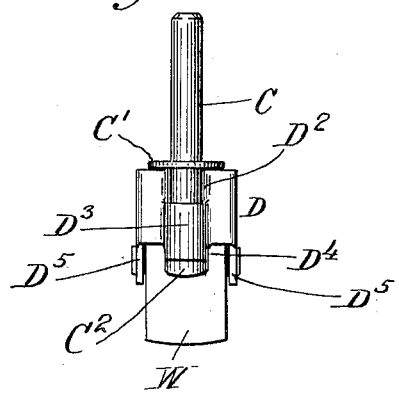
Figure 3:
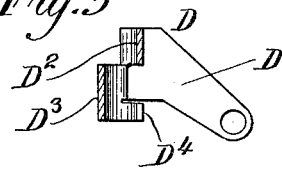
Figure 4:
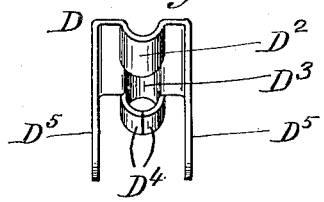
Figure 5:
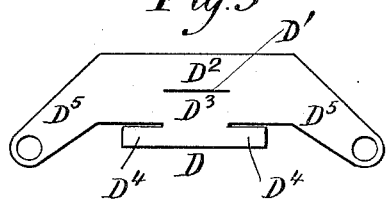

In the drawings, Figure 1 is a side elevation of a caster embodying the improvement and applied to a wooden leg, which is shown in cross-section; Fig. 2 is an elevation of the same caster at right angles; Fig. 3 is a detail view, showing the caster jaws in central section; Fig. 4 is an inclined view of the caster jaws with the pin removed; Fig. 5 is a view of the blank from which the jaws are made.

In the drawings, the leg is shown in Fig. 1, in section and marked B. The pin C of the caster is secured by being driven into a suitable hole bored to fit it in the leg. The caster jaws D swivel upon the projecting lower portion of the pin. The pin is provided with a collar C', which rests upon the jaws and carries the weight of the leg, and a head $C^2$ at its lower end, which secures the jaws on the pin.

The caster jaws are formed of a sheet-metal blank, as shown in Fig. 5. The blank is slitted, as at D', and the portion $D^2$ above the slit is bent toward the caster wheel W to form an upper semi-circular or partial bearing on one side only of the pin. The portion $D^3$ beneath the slit is similarly bent in the opposite direction, forming a lower semi-circular bend or partial bearing on the opposite side of the pin, but the lower portion of this lower bearing $D^3$ has two ears or extensions $D^4$, which are bent around the pin and form a complete tubular continuation of the lower bearing at the lower end. The blank is also bent upon two vertical lines to form the two arms or sides $D^5$ of the caster jaws, as shown.

I here make no claim broadly to forming half bearings in caster jaws by means of slits and semi-circular portions, but it will be seen that in addition to the two semi-circular bearings, well adapted to prevent tilting of the caster jaws in the one direction under the weight of the leg, this caster has its pin completely encircled at the lower end by the metal of the caster jaw, thus affording a third bearing to prevent tilting in the opposite direction, which bearing is formed by the two ends $D^4$ of the tubular extension of the lower semi-circular bearing $D^3$. This third bearing is thus formed in such a manner that the lower semi-circular bearing itself continues all the way down to the lowest possible point of bearing against the pin, giving the maximum length of bearing and consequent strength of the caster jaws for any given length of contact between the pin and the jaws. It will be seen that the upward pressure on the caster wheel W forces the upper bearing against the pin in one direction (away from the caster wheel) and forces the lower bearing against the pin in the opposite direction (toward the caster wheel), and since in this improved construction the lower bearing $D^3$ extends all the way down to the head $C^2$ of the pin, it gives the maximum length and strength of bearing on the sides and at the points of greatest strain between the jaws and the pin.

I claim and desire to secure the following:

1. A caster having a caster wheel, jaws and pin, and in which the caster jaws are of sheet metal slitted and spread open for the pin between two substantially semicircular oppositely-bent bearing portions for the pin which bear on opposite sides of the pin, and one of the said bearing portions having a continuation at its end remote from the other bearing which substantially encircles the pin and is adapted to bear on the pin from all sides.

2. A caster having a caster wheel, jaws and pin, the said jaws comprising a piece of sheet metal slitted and spread open for the pin between two oppositely bent portions which form upper and lower partial bearings acting on opposite sides of the pin, the said lower bearing being on the side away from the caster wheel and being provided with an extension substantially encircling the pin and forming a tubular bearing in continuation of such lower partial bearing.

3. A caster having a caster wheel, jaws and pin, and in which the jaws are of sheet metal and have a lower bearing for the pin on the side away from the wheel, which bearing is formed by a bent portion of the sheet metal in which the sheet lies parallel with and bears against the pin and at its lower part extends substantially around the pin and is adapted to bear on any side of the pin, the said jaws also having an upper bearing for the pin on the same side as the caster wheel.

In testimony whereof I have signed this specification in the presence of two subscribing witnesses: this 25 day of August, 1913.

ALBERT B. DISS.

Witnesses:
    HAROLD BINNEY,
    A. PSCHIERER.

Copies of this patent may be obtained for five cents each, by addressing the "Commissioner of Patents, Washington, D. C."